INVENTOR.
HOWARD J. SLOANE
BY
*Paul R. Harder*

ATTORNEY

United States Patent Office 3,471,212
Patented Oct. 7, 1969

3,471,212
OPTICAL FILTERING DEVICES INCLUDING POLYVINYL CHLORIDE MICROPOROUS MATRIX
Howard Jules Sloane, Fullerton, Calif., assignor to Beckman Instruments, Inc., a corporation of California
Filed Mar. 16, 1965, Ser. No. 440,079
Int. Cl. G02b 5/20, 13/14; G02f 3/00
U.S. Cl. 350—1                                    8 Claims

ABSTRACT OF THE DISCLOSURE

Optical filters for the infrared region of 20–33 microns are disclosed which utilize a transmitting matrix of high and low refractive index material of microporous polyvinyl chloride for selectively scattering all wave-lengths shorter than a critical wavelength and which has a relatively sharp cut-on front. By the inclusion of materials having absorption bands at wavelengths longer than the cut-on wavelength of the scattering medium, the cut-on front may be sharpened and positioned to provide a filter suitable for use in the aforementioned region.

---

This invention relates generally to the selection of radiant energy and more particularly to means capable of selectively transmitting infrared radiation while attenuating all wavelengths shorter than a preselected wavelength.

In my co-pending application for Optical Filtering Devices and Methods of Making Same, Ser. No. 348,387, filed Mar. 2, 1964, and in the co-pending application of Howard J. Sloane and Gerald T. Keahl for Optical Filtering Devices and Methods of Making Same, Ser. No. 348,444, filed Mar. 2, 1964, and each assigned to the assignee of the instant invention, there is disclosed in detail and claimed optical filters which produce selective scattering of all wavelengths shorter than some critical wavelength and which utilize various materials having absorption bands at wavelengths longer than this critical wavelength to control and preselect the cut-on wavelength and shape the cut-on front of the particular filter.

These filters are particularly useful in the infrared region at wavelengths longer than approximately 30 microns. It should be understood that the term "useful" in reference to the previously disclosed and claimed filters is relative in that they may be utilized in regions below 30 microns at a loss in energy. For example, as can be seen from FIG. 5 of co-pending application, Ser. No. 348,387, one particular filter utilizing a polyethylene membrane as a scattering medium and freshly smoked MgO as an absorption medium provides a filter which transmits approximately 73% of the incident radiation above 37 microns and approximately 65% of the incident radiation above 30 microns. It may be seen from FIG. 5 that the cut-on front of this particular filter is quite sharp and the transmitted radiation falls to approximately 50% at about 28 microns. Thus this filter may find utility in the region above 28 microns depending upon the energy required in the system.

In many applications it is desirable to provide a filter for infrared radiation in regions of shorter wavelengths than those disclosed in the previous applications.

It is a principal object of this invention to provide an optical filter for use in the infrared region.

It is a more specific object of this invention to provide an optical filter for infrared radiation finding particular utility in the approximate region of 20–33 microns.

Another object is to provide an infrared filter finding utility in the 20–33 micron region and which is virtually opaque to frequencies at wavelengths shorter than approximately 16.5 microns.

Other objects and many of the attendant advantages of this invention will become more readily apparent to those skilled in the art as the same becomes better understood by reference to the following detailed description when considered in connection with the attached drawings wherein.

As used herein the term "cut-on front" of a filter means the transmission characteristics of a filter at its shorter wavelength of transmission. The term "cut-on wavelength" is used to mean that wavelength below which transmission of the material or filter is less than 1% and "cut-on front width" means the difference between the wavelength at which the filter reaches approximately 50% transmittance and the cut-on wavelength. It should be understood that these points are arbitrarily chosen so that the approximate configuration of the wave front may be defined and are utilized herein by way of example only and not by way of limitation.

As disclosed in the aforementioned applications, it has been discovered that certain plastic microporous membranes provide selective scattering of all wavelengths shorter than some critical wavelength and provide highly efficient optical filtering in the infrared region.

This is believed to be caused, at least in part, by the selective scattering of all wavelengths shorter than some critical wavelength that may be obtained from the even dispersion of two materials having differing indices of refraction. Certain of these materials provide highly optimum optical filtering devices because of their high degree of opacity to wavelengths shorter than a given cut-on wavelength and because of their relatively sharp cut-on front. By combining such materials with materials having absorption bands at wavelengths longer than the cut-on wavelength provided by the scattering medium, the cut-on front may be sharpened and positioned over a wide range to provide a filter having a preselected cut-on wavelength and cut-on front shape.

In the previous applications, Type OH and Type OS solvent resistant filters of polyethylene obtained from Millipore Filter Corporation, Bedford, Mass., were disclosed as having highly desirable optical characteristics in the infrared region. However, because the Type OS filter has a cut-on wavelength of approximately 26 microns and the Type OH filter transmits less than 10% of the incident radiation at 20 microns these filters do not find great utility in the 20–33 micron region.

It has been found that microporous polyvinyl chloride filters obtained from Millipore Filter Corporation, Bedford, Mass., have more desirable characteristics in this shorter wavelength region. Millipore's Type PVC–64 filter comprises a matrix of polyvinyl chloride having micron size pores uniformly distributed throughout the filter. The pore volume occupies a high percentage of the total volume of the filter. An earlier experimental material had also been provided by Millipore Filter Corporation under the designation 34–CE and this material has similar optical properties in the infrared region.

Figure 1:
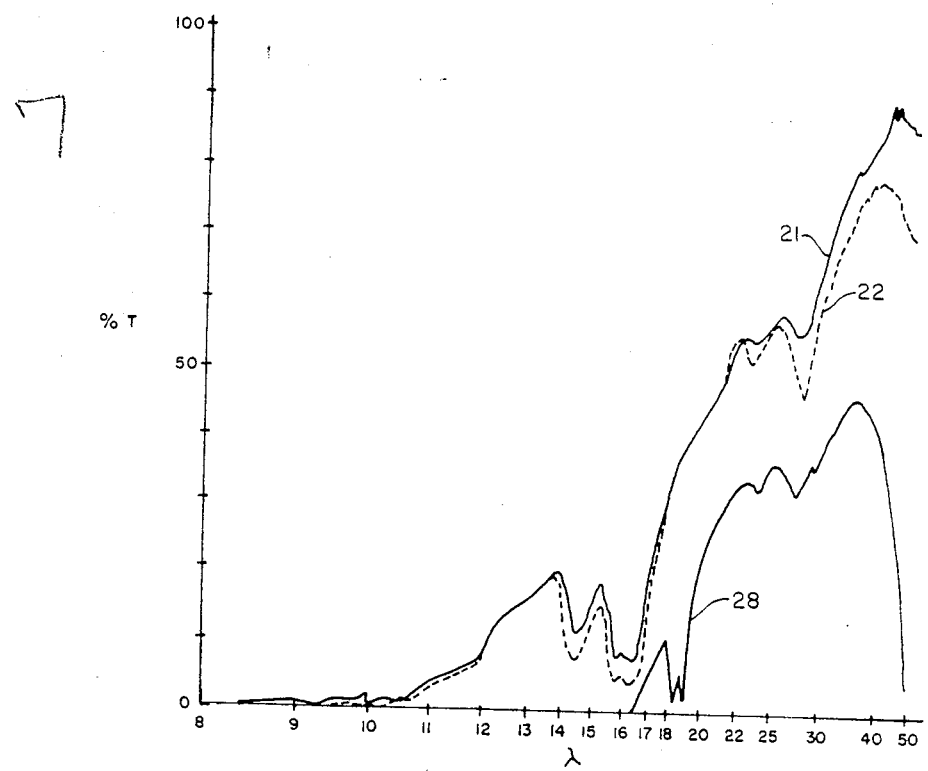
FIG. 1 illustrates the optical characteristic of certain microporous filters embodying the invention and the transmisison curve of one specific filter constructed after the teachings of this invention.

Curves 21 and 22 of FIG. 1 illustrate the transmission characteristics of Millipore's Type 34–CE and PVC–64 solvent resistant filters respectively. The Type 34–CE has a cut-on wavelength of approximately 9 microns and the Type PVC–64 filter has a cut-on wavelength of approximately 9.5 microns. Each of these filters transmits less than 1% of all wavelengths shorter than their respective cut-on wavelengths and each reaches approximately 50% transmittance at approximately 21 microns, i.e., they have cut-on front widths of approximately 12 and 11.5 microns respectively. Both filter types have a transmittance of approximately 44% at 20 microns; Type 34–CE reaches 70% transmittance at approximately 30 microns while the PVC–64 type reaches 70% transmittance at approximately 33 microns. Because of their high transmission qualities in the region from 20–30 microns and because of their high opacity at wavelengths shorter than the cut-on wavelength these membranes are highly useful as transmission filters in this infrared region. A detailed examination of these materials shows that substantially less than 1% transmittance, generally less than 0.5% occurs at frequencies shorter than about 8.3 microns.

The opacity of each of these filters at the short wavelengths is believed due to the scatter effect produced by a finely divided material having a low refractive index uniformly distributed throughout a matrix of material having a higher refractive index. In each of these filters the finely divided low refractive index material is air having a refractive index of 1.0 which is uniformly distributed through the pores of the polyvinyl chloride matrix which has a refractive index higher than that of air.

This finely divided, uniformly distributed, low refractive index material in a matrix of high refractive index material provides a scattering medium which selectively scatters incident radiation for all wavelengths shorter than the cut-on wavelength while passing wavelengths longer than this critical wavelength.

It has been found that the optical characteristics of various specimens of the same type of filter obtained from Millipore Filter Corporation vary slightly from specimen to specimen and the curves of FIG. 1 are, therefore, illustrate of only one specimen of each type. For example, the particular cut-on wavelength and the cut-on front may vary slightly from sample to sample. Although the reasons for these variations are not fully understood, it is believed that these variations are due to minor variations in the manufacturing process. It is believed that the variations in the cut-on wavelength and the sharpness of the cut-on front result from slight variations in the porosity of the filter, i.e., the ratio of the pore volume to the total volume of the filter, variations in the average pore size, and variations in the distribution of the pore size.

By combining with these scattering media materials having absorption bands in the shorter wavelength transmitting region of the scattering media in sufficient concentrations to absorb substantially all of the radiation transmitted by the scattering media over a desired region, the cut-on front may be shaped to provide a useful filter in the 20–33 micron region.

Figure 2:
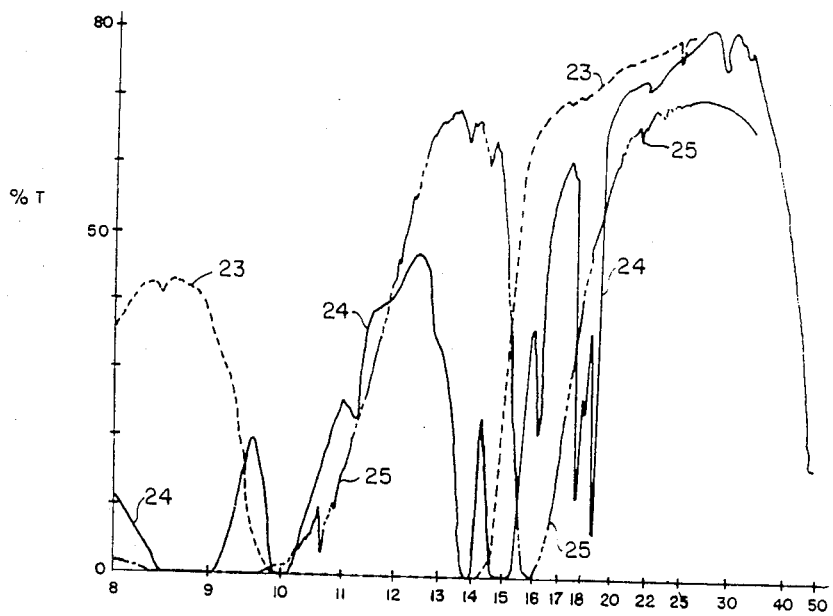
FIG. 2 illustrates the absorption bands in the infrared region of various materials which find utility as absorbence materials in filters constructed after the teachings of this invention.

Referring now to FIG. 2 there is illustrated the transmission characteristics of various materials having absorption bands in the short wavelength transmission regions of the filters of FIG. 1. Curve 23 represents the absorption band of BeO at a very low concentration. Curve 23 was obtained from 10 mg. of BeO in 300 mg. of polyethylene, dry mixed and pressed into a 1.25 inch diameter disc in the manner set forth more fully hereinafter. As illustrated, this inorganic material has an absorption band, which, at the concentration utilized, is substantially opaque from approximately 10 microns to 14.3 microns and, when combined with either of the scattering media having characteristics illustrated in FIG. 1, provides a moderately useful filter for the 20–29 micron region since the transmission characteristics of these filters, and particularly when combined with the PVC–64 type scattering medium, has low transmittance at wavelengths shorter than approximately 14.5 microns.

Certain applications may require additional attenuation of wavelengths in the 14.5–16.5 micron region. The low transmittance of PVC–64 in this region provides a portion of this attenuation. Various inorganic salts have absorption bands in this region along with generally high transmission in the 20–33 micron region and may be used to provide still further attenuation in the 14.5–16.5 micron region. Such inorganic materials as anhydrous $K_2S_2O_3$, anhydrous $Na_2S_2O_3$, $KClO_4$, $KOCN$ and $PbCO_3$ have been found useful and are merely exemplary of the materials having absorption bands in this region. For even further improvement of the filter such compounds as $KClO_4$, $K_2SO_4$ and the thiosulfates provide additional attenuation in the 8.3–10 micron region. The absorption bands of $K_2S_2O_3$ and $KClO_4$ are illustrated respectively by curves 24 and 25 of FIG. 2. The absorption curve 24 for anhydrous $K_2S_2O_3$ was obtained from a wafer containing 25 mg. of anhydrous $K_2S_2O_3$ and 150 mg. of polyethylene powder. This wafer was prepared by the mulling technique to fabricate a 1.25 inch diameter disc by the process more fully disclosed hereinafter. The absorption bands at approximately 8.6, 10, 15 and 19 and the side band at approximately 16 microns are absorption bands of anhydrous $K_2S_2O_3$ while the band at approximately 14 microns is an absorption band of polyethylene. It should be noted, however, that the wafer has a high transmission in the region from 20–33 microns, the region of interest. Since the scattering medium is opaque below 8.5 microns and BeO is opaque from approximately 10 to 14.3 microns, additional attenuation in the 15.4–16.5 micron region is desired.

Curve 25 of FIG. 2 illustrates the absorption band of 10 mg. of $KClO_4$ in a matrix of 300 mg. of KBr formed into a wafer having a 0.2 in.$^2$ area. It should be noted that there is a principal absorption band at approximately 16.4 microns and the material transmits more than 60% of the incident radiation between 20 and 33 microns, the region of interest.

By combining these inorganic materials in one or more suitable absorbing matrices, undesired radiation transmitted in the 8.3–16.5 micron region by the polyvinyl chloride scattering filters of FIG. 1 may be eliminated. The matrix for these absorbing materials may be one of several infrared transmitting materials such as CsI, CsBr and KBr, the latter in thin layers, but generally polyethylene is a very convenient matrix since it is quite transparent in the infrared region beyond 15 microns, is available in powdered form for ease of mixing and handling and can be hot pressed and mixed with hydrocarbon (or mineral) oil when necessary. The only critical criterion of the matrix which contains the absorbing material is that the matrix material has no intense absorption bands in the region of interest. Although it is quite desirable that the transmission characteristics of this material be higher than that of the scattering medium in the region of interest, even this requirement is not critical so long as the energy lost by absorption in the region of interest by the matrix material can be tolerated.

The preparation of some of these inorganic materials in polyethylene matrices has been found, to some extent, to be critical. For such inorganic salts as TlI, which may be utilized to provide additional scattering as hereinafter more fully described, and BeO it has been found sufficient to finely divide these salts and thoroughly mix them with a quantity of finely divided matrix material such as polyethylene powder, for example, U. S. Industrial Chemical's Microthene 620, and press them in a die at moderate temperatures to form a wafer. After the absorbing materials and the polyethylene powder are finely divided and thoroughly mixed, the blended powder is placed in a die, heated to a temperature sufficient to cause the polyethylene to flow but which is below the fusion temperature of the absorbence material and compacted at high pressures, for example, approximately 2,000 p.s.i. to produce a wafer of any desired shape, generally a thin, flat disc. Temperatures of approximately 100° C. have been found suitable to cause the polyethylene to freely flow without causing fusion of the absorbence material. The material is allowed to cool under pressure to approximately 65° C. or less before removal from the die.

However, for some inorganic salts, such as, for example, anhydrous $K_2S_2O_3$ and $K_2SO_4$, better results and more uniform distribution of the salt throughout the matrix can be achieved by mulling the salts with a highly refined mineral oil while thoroughly grinding, slowly adding quantities of polyethylene powder and additional mineral oil, if necessary, until a creamy, uniform mixture is obtained. This mixture is placed in a die, heated and pressed at sufficient temperatures to cause fusion of the polyethylene into a thin, flat wafer of any suitable shape. Temperatures of approximately 100° C. and pressures of about 2,000 p.s.i. have been found suitable for this purpose. During the pressing process the mineral oil becomes less viscous, flows from the wafer and a portion appears to evaporate. To remove the residual oil, the wafer may then be dried in a warm vacuum oven or leached with any organic solvent which does not dissolve polyethylene such as, for example, hexane or heptane. During this leaching process the wafer may become deformed and shrink and, if so, may be re-heated to a temperature sufficient to soften the polyethylene and re-pressed to flatten the wafer and reproduce its original size. A temperature of approximately 100° C. has been found suitable for this re-heating process. This leaching, re-heating and pressing process may, if desired, be repeated.

The amount of polyethylene utilized as the matrix material is generally not critical. Too little of the polyethylene powder produces a matrix which is brittle. A slight excess of polyethylene does not materially affect the performance of the filter except for a slight decrease in energy. However, a large excess of polyethylene produces a significant decrease in the transmitted energy.

For the preparation of an optical filter after the foregoing teachings sufficient quantities of anhydrous $K_2S_2O_3$, $KClO_4$, and BeO, to provide, respectively, concentrations of 20.4 mg./in.$^2$, 28.5 mg./in.$^2$ and 6.5 mg./in.$^2$ were finely divided and mixed with quantities of finely divided polyethylene powder.

More specifically, 25 mg. of anhydrous $K_2S_2O_3$ was thoroughly ground in the dry state. Small amounts of Nujol mineral oil were added while continuing the grinding until a creamy paste was formed. Approximately 150 mg. of Microthene 620 polyethylene powder was subsequently added while continuing to mull the mixture with the addition of sufficient mineral oil to produce a thick creamy mixture. This mixture was heated in a 1.25 inch diameter round die to approximately 100° C. while being pressed at approximately 2,000 p.s.i. After cooling to approximately 65° C. or less the wafer was removed, leached with hexane to remove the oil residue, re-heated to approximately 100° C. and re-pressed at 2,000 p.s.i., and again leached before a final heating and pressing process.

With approximately 200 mg. of Microthene 620 polyethylene powder, 35 mg. of $KClO_4$ and 8 mg. of BeO were thoroughly ground. This mixture was ground in the dry state and then pressed in the 1.25 inch die at approximately 100° C. under 2,000 p.s.i. of pressure. After the two discs are formed they may, if desired, be again placed within the die and re-heated under pressure to cause the discs to fuse together forming a single thin wafer of the absorbing material. The fused discs when subjected to radiation had an optical characteristic illustrated by curve 26 of FIG. 3.

When secured in series with the Millipore Type PVC–64 polyvinyl chloride filter and when subjected to radiation the composite filter has an optical characteristic illustrated by curve 28 of FIG. 1. The composite filter has a cut-on wavelength of approximately 16.5 microns and transmits approximately 30% of the incident radiation at 21 microns and 45% at 34 microns, the region of intended use.

Figure 3:
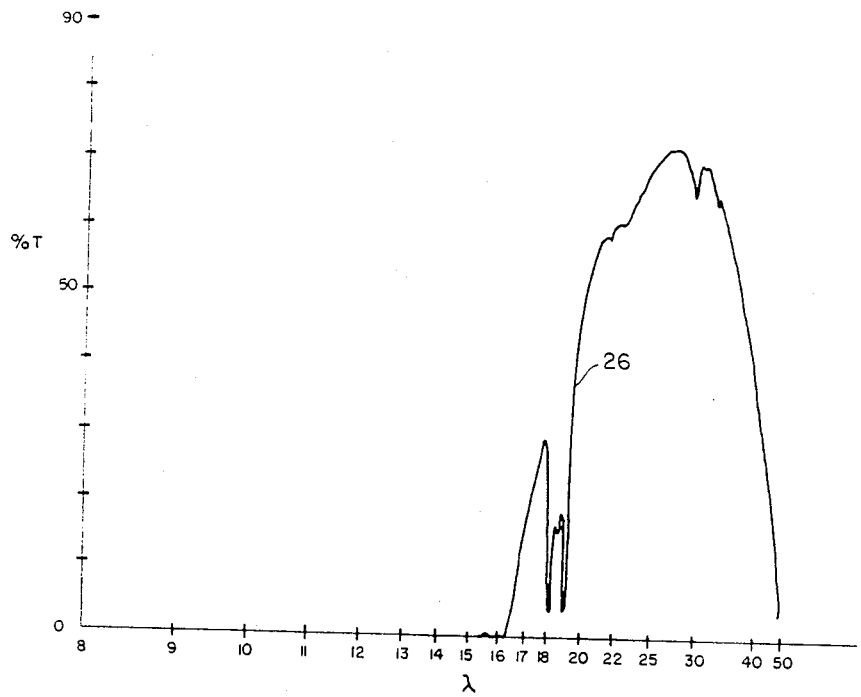
FIGS. 3 and 4 illustrate the optical characteristics of two absorbence matrices constructed in accordance with the teachings of this invention and which find utility in the optical filters taught herein.

From curve 26 of FIG. 3 it should be noted that there is a slight leakage of radiation at approximately 15.5 microns; this leakage being generally in the order of 1 or 2%. If additional leakage at this wavelength can be tolerated an additional increase in the transmitted radiation in the 20 to 30 micron region may be obtained by decreasing the amount of $KClO_4$ in the absorbing matrix.

Figure 4:
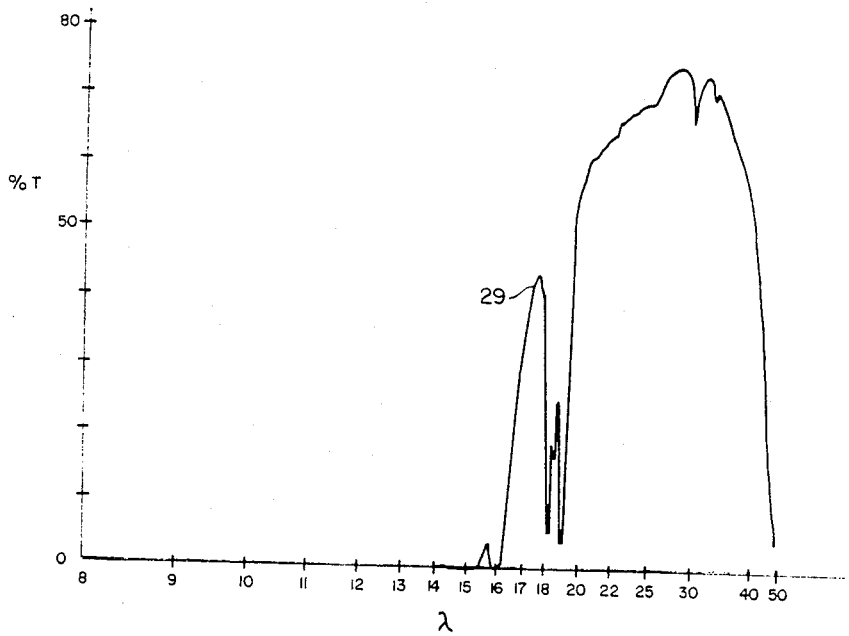

For example, curve 29 of FIG. 4 illustrates the transmission characteristics of an absorbing matrix composed of 25 mg. of $K_2S_2O_3$, 20 mg. of $KClO_4$ and 8 mg. of BeO in a polyethylene matrix. The radiation leak at approximately 15.5 microns in this formulation reaches approximately 5% of the incident radiation, however, the absorbing matrix transmits approximately 63% of the incident radiation at 21 microns rather than the 59% transmitted by the previous absorbence matrix and approximately 70% at 33 microns rather than 65% as in the previous absorbence matrix. Although the transmission curve of this absorbence matrix when combined with a scattering medium such as the polyvinyl chloride membrane PVC–64 has not been illustrated the transmission curve is generally similar to the curve 28 except for a general increase of approximately 3 to 4% in transmitted energy over the 20–33 micron region and slightly greater leakage at 15.5 and 16.5 microns.

As has been previously stated controlled scattering of radiation may be accomplished by the even distribution of a material having a high refractive index throughout a material having a low refractive index. Additional scattering, and thereby additional attenuation in the shorter wavelength region may be provided in each of the foregoing filters by incorporating approximately 5 mg. of TlI in the absorbing matrix. TlI has a refractive index of 2.8 and polyethylene has a refractive index of approximately 1.5. By finely dividing the TlI along with the absorbing materials in a polyethylene matrix additional scattering in the region of wavelengths shorter than approximately 8 microns may be obtained. At this low a concentration the TlI does not appreciably attenuate the longer wavelength 20–33 micron region of use.

Another formulation of the absorbence matrix which finds utility in the 20 to 33 micron region incorporates 5 mg. of anhydrous $K_2S_2O_3$, 5 mg. of $K_2SO_4$ and 8 mg. of BeO in a matrix of 150 mg. of polyethylene powder. In this absorbing matrix all of the inorganic salts were thoroughly ground and mixed with the polyethylene powder in the dry state and hot pressed in the manner described into a 1.25 inch diameter disc. The absorption characteristics of this wafer are similar to that illustrated by curve 29 of FIG. 4 for the heavier concentration of the same materials except for a general increase in energy over the entire region. This wafer transmits approximately 20% of the incident radiation at approximately 15.5 microns and does not become opaque at 16 microns, transmitting approximately 5% at this wavelength. The region from approximately 16 to 20 microns is almost identical to curve 29 except that the absorption bands between 18 and 19 microns are not as deep, reaching approximately 35% transmittance. This formulation, however, does reach approximately 80% transmittance in the 28–35 micron region. The matrix does not become opaque until approximately 14.3 microns. Thus it may be seen that by decreasing the concentration increased energy in the region of interest, 20–33 microns, may be obtained at the expense of an increase in transmission at the shorter wavelength regions. However, when combined with a polyvinyl chloride scattering membrane for elimination of radiation in the shorter wavelength region this filter provides a useable filter in the 20 to 33 micron region.

From the foregoing it should be apparent that the formulations of the absorbing matrices may be readily adjusted depending upon the particular desired characteristics of the filter. As illustrated increased transmission in certain regions may be obtained generally at the expense of an increase in leaked radiation in the shorter wavelength region. If less leaked light in the shorter wavelength region is desired heavier concentrations of the materials may be utilized generally at the expense of loss in transmission in the higher wavelength regions. Further, other inorganic salts having absorption bands in these regions may be substituted or combined with the inorganic salts disclosed herein to block radiation in the regions of desired opacity.

It should be understood that although in the examples given either specific concentrations or specific amounts of the absorbing materials have been set forth, these concentrations or amounts are generally not critical. Variations in these amounts may be made to tailor the filter to the particular characteristics in terms of transmitted radiation and leaked light.

It should further be understood that the cut-on wavelength, the cut-on front shapes, and the various transmittance values at particular wavelengths given throughout this specification and illustrated by the curves in the drawings are only exemplary and are produced by one particular filter constructed after the teachings of this invention. It should be appreciated that these values will vary somewhat from filter to filter depending upon the care taken in the weighing of the particular compounds, the procedures followed in forming the filter disc and the calibration of the instrument upon which the spectrum is run. Thus, the specific formulations and the curves are given by way of illustration only and not by way of limitation and many modifications and variations of the present invention are possible in light of the foregoing teachings without departing from the spirit and scope of the invention as set forth in the appended claims.

What is claimed is:

1. An optical filter for use in the infrared region comprising:
    a polyvinyl chloride matrix having micron size pores of substantially uniform diameter substantially evenly distributed therethrough, said matrix being substantially opaque to all wavelengths shorter than a first wavelength; and
    at least one material having an absorption band in the shorter wavelength transmission region of said matrix and absorbing at least a portion of the energy transmitted by said matrix.

2. An optical filter for use in the infrared region comprising:
    a polyvinyl chloride matrix having micron size pores of substantially uniform diameter substantially evenly distributed therethrough, said matrix being substantially opaque to all wavelengths shorter than a first wavelength; and
    a plurality of absorbing materials having radiation absorption bands in the shorter wavelength transmission region of said matrix and absorbing at least a portion of the energy transmitted by said matrix.

3. An optical filter for use in the infrared region comprising the combination of:
    a first polyvinyl chloride matrix having micron size pores of substantially uniform diameter substantially evenly distributed therethrough, said matrix being substantially opaque to radiation of wavelengths shorter than a first wavelength;
    at least a second matrix having at least one finely divided absorbing material evenly distributed therethrough, said finely divided material having at least one absorption band in the shorter wavelength transmission region of said first matrix and absorbing at least a portion of the energy transmitted by said first matrix.

4. An optical filter for use in the infrared region comprising the combination of:
    a first polyvinyl chloride matrix having micron size pores of substantially uniform diameter substantially evenly distributed therethrough, said matrix being substantially opaque to all wavelengths shorter than a first wavelength; and
    at least a second matrix having a plurality of absorbing materials each having an absorption band in the shorter wavelength transmission of said first matrix and absorbing at least a portion of the energy transmitted by said first matrix.

5. An optical filter for use in the infrared region comprising:
    a polyvinyl chloride matrix having micron size pores of substantially uniform diameter substantially evenly distributed therethrough, said matrix being substantially opaque to all wavelengths shorter than a first wavelength and at least one material having an absorption band in the region of wavelengths longer than said first wavelength selected from the group BeO, anhydrous $Na_2S_2O_3$, anhydrous $K_2S_2O_3$, $KClO_3$, $K_2SO_4$, KOCN and $PbCO_3$.

6. An optical filter for use in the infrared region comprising:
    a polyvinyl chloride matrix having micron size pores of substantially uniform diameter substantially evenly distributed therethrough, said matrix being substantially opaque to all wavelengths shorter than a first wavelength; and
    a plurality of absorbing materials each having an absorption band in the regions of wavelengths longer than said first wavelength selected from the group BeO, anhydrous $Na_2S_2O_3$, anhydrous $K_2S_2O_3$, $KClO_3$, $K_2SO_4$, KOCN and $PbCO_3$.

7. An optical filter for use in the infrared region comprising:
    a polyvinyl chloride matrix having micron size pores of substantially uniform diameter substantially evenly distributed therethrough, said matrix being substantially opaque to all wavelengths shorter than a first wavelength; and
    a plurality of absorbing materials having absorption bands in the shorter wavelength transmission region of said matrix, said plurality of absorbing materials including $K_2S_2O_3$, $KClO_3$ and BeO.

8. An optical filter for use in the infrared region comprising:
    a polyvinyl chloride matrix having micron size pores of substantially uniform diameter substantially evenly distributed therethrough, said matrix being substantially opaque to all wavelengths shorter than a first wavelength; and
    a plurality of absorbing materials having absorption bands in the shorter wavelength transmission region of said matrix, said plurality of absorbing materials including $K_2S_2O_3$, $K_2SO_4$ and BeO.

References Cited

UNITED STATES PATENTS

| | | | |
|---|---|---|---|
| 2,624,239 | 1/1953 | Blout et al. | 117—33.3 |
| 2,624,240 | 1/1953 | Blout et al. | 117—33.3 |
| 3,262,834 | 7/1966 | Abell et al. | |
| 3,290,203 | 12/1966 | Antonson et al. | |

OTHER REFERENCES

Blout, Corley and Snow, "Infra-Red Transmitting Filters. II. The Region 1 to 6μ," 40 J.O.S.A., 415, July 1950.

Yamada et al., "Transmission Filters in the Far-Infrared Region," J.O.S.A., vol. 52, pp. 17–19.

DAVID SCHONBERG, Primary Examiner

T. H. KUSMER, Assistant Examiner

U.S. Cl. X.R.

250—86; 350—316